US012447008B2

(12) United States Patent
Scott et al.

(10) Patent No.: US 12,447,008 B2
(45) Date of Patent: Oct. 21, 2025

(54) INTRAOCULAR LENS WITH ROTATIONAL RESISTANCE AND NEGATIVE DYSPHOTOPSIA MITIGATION

(71) Applicant: Alcon Inc., Fribourg (CH)

(72) Inventors: James M. Scott, Weatherford, TX (US); Kamal K. Das, Arlington, TX (US)

(*) Notice: Subject to any disclaimer, the term of this patent is extended or adjusted under 35 U.S.C. 154(b) by 143 days.

(21) Appl. No.: 17/546,987

(22) Filed: Dec. 9, 2021

(65) Prior Publication Data
US 2022/0192820 A1   Jun. 23, 2022

Related U.S. Application Data

(60) Provisional application No. 63/126,760, filed on Dec. 17, 2020.

(51) Int. Cl.
*A61F 2/16* (2006.01)
*A61F 9/007* (2006.01)

(52) U.S. Cl.
CPC ............ *A61F 2/1613* (2013.01); *A61F 9/007* (2013.01); *A61F 2002/16901* (2015.04); *A61F 2002/1696* (2015.04)

(58) Field of Classification Search
CPC .................... A61F 2002/1696; A61F 2/164
See application file for complete search history.

(56) References Cited

U.S. PATENT DOCUMENTS

| | | | |
|---|---|---|---|
| 3,751,138 A | 8/1973 | Humphrey | |
| 4,743,254 A * | 5/1988 | Davenport | A61F 2/1616 623/6.17 |
| 5,266,074 A * | 11/1993 | Nishi | A61F 2/16 623/6.39 |
| 6,027,531 A | 2/2000 | Tassignon | |
| 8,128,693 B2 | 3/2012 | Tran et al. | |
| 8,647,384 B2 | 2/2014 | Lu | |
| 9,566,150 B2 | 2/2017 | Angelopoulos et al. | |
| 10,285,805 B2 * | 5/2019 | de Juan, Jr. | A61F 2/1635 |

(Continued)

FOREIGN PATENT DOCUMENTS

| | | |
|---|---|---|
| CA | 2903598 A1 | 7/2008 |
| EP | 2039324 A1 * | 3/2009 ............ A61F 2/1613 |

(Continued)

OTHER PUBLICATIONS

Fram, Nicole R., Persistent negative dysphotopsia and small eyes, Journal of Cataract and Refractive Surgery, vol. 47, Issue 8, Aug. 2021.

(Continued)

*Primary Examiner* — Javier G Blanco

(57) ABSTRACT

An ophthalmic lens may comprise a posterior optic surface and an anterior optic surface, which may comprise a central optic, a peripheral optic, and a capsule rim separating the central optic and the peripheral optic. An optic edge may couple the posterior optic surface to the peripheral optic. The capsule rim may be symmetric or asymmetric in various embodiments. In more particular embodiments, the capsule rim may form a surface at an angle of at least ninety (90) degrees to the peripheral optic. In some embodiments, the central optic may comprise an optic axis, and the capsule rim may form a surface that is substantially parallel to the optic axis.

14 Claims, 10 Drawing Sheets

(56) References Cited

U.S. PATENT DOCUMENTS

| | | |
|---|---|---|
| 2004/0186241 A1 | 9/2004 | Gemert |
| 2005/0021137 A1* | 1/2005 | Blake .................... A61F 2/1618 623/6.24 |
| 2005/0187621 A1* | 8/2005 | Brady .................... A61F 2/1616 623/6.49 |
| 2006/0066808 A1* | 3/2006 | Blum .................... G02C 7/061 351/159.11 |
| 2008/0046076 A1 | 2/2008 | Rombach |
| 2008/0269881 A1* | 10/2008 | Simpson ............... A61F 2/1613 623/6.17 |
| 2008/0269885 A1 | 10/2008 | Simpson et al. |
| 2008/0269889 A1 | 10/2008 | Simpson |
| 2008/0269890 A1 | 10/2008 | Simpson et al. |
| 2010/0234943 A1 | 9/2010 | Portney |
| 2011/0060409 A1 | 3/2011 | Portney |
| 2011/0125261 A1 | 5/2011 | Portney |
| 2011/0153014 A1* | 6/2011 | Zhang .................... A61F 2/1624 623/6.34 |
| 2011/0251686 A1 | 10/2011 | Masket |
| 2013/0190868 A1* | 7/2013 | Kahook ................ A61F 2/1635 623/6.38 |
| 2014/0163676 A1 | 6/2014 | Masket |
| 2014/0168602 A1* | 6/2014 | Weeber ................ A61F 2/1618 351/159.48 |
| 2015/0342728 A1 | 12/2015 | Simonov et al. |
| 2016/0184088 A1 | 6/2016 | Wanders |
| 2016/0199176 A1* | 7/2016 | Wanders ............... A61F 2/1648 623/6.34 |
| 2016/0317287 A1 | 11/2016 | Silvestrini |
| 2017/0239040 A1* | 8/2017 | Coroneo ............... A61F 2/1656 |
| 2019/0307555 A1 | 10/2019 | Das et al. |
| 2020/0197164 A1 | 6/2020 | Das et al. |
| 2020/0345481 A1 | 11/2020 | Ellis |

FOREIGN PATENT DOCUMENTS

| | | |
|---|---|---|
| WO | 2020083828 A1 | 4/2020 |
| WO | 2020083829 A1 | 4/2020 |

OTHER PUBLICATIONS

Masket, Samuel, Piggyback IOL, reverse optic capture may mitigate postop negative dysphotopsia, OSN SuperSite Ocular Surgery News U.S. Edition Oct. 10, 2011.

Masket, Samuel, Solving the Problem of Negative Dysphotopsia, p. 60-64, Cataract & Refractive Surgery Today, May 2014.

Rupnik, et al.: Clinical experience with an anti dysphotopic IOL, Saudi Journal of Ophthalmology—vol. 36, Issue 2, Apr.-Jun. 2022.

* cited by examiner

INTRAOCULAR LENS WITH ROTATIONAL RESISTANCE AND NEGATIVE DYSPHOTOPSIA MITIGATION

PRIORITY CLAIM

This application claims the benefit of priority of U.S. Provisional Patent Application Ser. No. 63/126,760 titled "INTRAOCULAR LENS WITH ROTATIONAL RESISTANCE AND NEGATIVE DYSPHOTOPSIA MITIGATION," filed on Dec. 17, 2020, whose inventors are James M. Scott and Kamal K. Das, which is hereby incorporated by reference in its entirety as though fully and completely set forth herein.

TECHNICAL FIELD

The invention set forth in the appended claims relates generally to ophthalmic lenses, including, without limitation, intraocular lenses.

BACKGROUND

The human eye can suffer a number of maladies, which can cause mild deterioration to complete loss of vision in some instances. While contact lenses and eyeglasses can compensate for some ailments, ophthalmic surgery may be required for others. In some instances, implants may be beneficial or desirable. For example, an intraocular lens may replace a clouded natural lens within an eye to improve vision.

While the benefits of intraocular lenses and other implants are known, improvements to lenses, delivery systems, components, and processes continue to improve outcomes and benefit patients.

BRIEF SUMMARY

New and useful systems, apparatuses, and methods for eye surgery are set forth in the appended claims. Illustrative embodiments are also provided to enable a person skilled in the art to make and use the claimed subject matter.

For example, some embodiments comprise an intraocular lens that can take advantage of precise capsulorhexis openings created with femtosecond lasers to improve rotational resistance and reduce negative dysphotopsia or visual disturbances. More particularly, some embodiments may connect the anterior capsule to an intraocular lens using the capsulorhexis opening, which can increase rotational resistance of the lens and sequester the edge of the capsulorhexis opening.

More generally, an ophthalmic lens may comprise a posterior optic surface and an anterior optic surface, which may comprise a central optic, a peripheral optic, and a capsule rim separating the central optic and the peripheral optic. An optic edge may couple the posterior optic surface to the peripheral optic. The capsule rim may be symmetric or asymmetric in various embodiments. In more particular embodiments, the capsule rim may form a surface at an angle of at least ninety (90) degrees to the peripheral optic. In some embodiments, the central optic may comprise an optic axis, and the capsule rim may form a surface that is substantially parallel to the optic axis.

The capsule rim may have a thickness that is at least as thick as the thickness of an anterior capsular bag. For example, a suitable thickness may be in a range of about 19 micrometers to about 20 micrometers. In some embodiments, the thickness of the capsule rim may be up to five (5) times the thickness of an anterior capsular bag.

Additionally, or alternatively, the central optic or the capsule rim may have a radius configured to provide elastic tension in a capsulorhexis. A radius in a range of about 2 millimeters to about 3 millimeters may be suitable for some embodiments.

Additionally, or alternatively, some embodiments of the peripheral optic may comprise a textured surface, which can be configured to reduce transmission of or diffuse the scatter light.

In some embodiments, the capsule rim may comprise a closed curve having at least one convex arc and at least one concave arc.

A method of implanting an intraocular lens into a capsular bag of an eye may comprise creating a capsulorhexis in an anterior portion of the capsular bag; removing the natural lens from the capsular bag; and inserting the intraocular lens into the capsular bag, wherein the intraocular lens comprises an anterior optic surface having a peripheral optic disposed within the capsular bag, a capsular rim adjacent to an edge of the capsulorhexis, and a central optic disposed within the capsulorhexis and substantially flush with the capsular bag. In some embodiments, the intraocular lens may comprise at least two haptics that engage the capsular bag to secure the intraocular lens. Additionally, or alternatively, the central optic may have a width larger than a width of the capsulorhexis to create tension in the capsulorhexis. Some embodiments of the peripheral optic may additionally comprise a textured surface configured to reduce transmission of or scatter light.

Features, elements, and aspects described in the context of some embodiments may also be omitted, combined, or replaced by alternative features. Other features, objectives, advantages, and a preferred mode of making and using the claimed subject matter are described in greater detail below with reference to the accompanying drawings of illustrative embodiments.

BRIEF DESCRIPTION OF THE DRAWINGS

The accompanying drawings illustrate some objectives, advantages, and a preferred mode of making and using some embodiments of the claimed subject matter. Like reference numbers represent like parts in the examples.

DESCRIPTION OF EXAMPLE EMBODIMENTS

The following description of example embodiments provides information that enables a person skilled in the art to make and use the subject matter set forth in the appended claims, but it may omit certain details already well known in the art. The following detailed description is, therefore, to be taken as illustrative and not limiting.

The example embodiments may also be described herein with reference to spatial relationships between various elements or to the spatial orientation of various elements depicted in the attached drawings. In general, such relationships or orientation assume a frame of reference consistent with or relative to a patient in a position to receive an implant. However, as should be recognized by those skilled in the art, this frame of reference is merely a descriptive expedient rather than a strict prescription.

Figure 1:
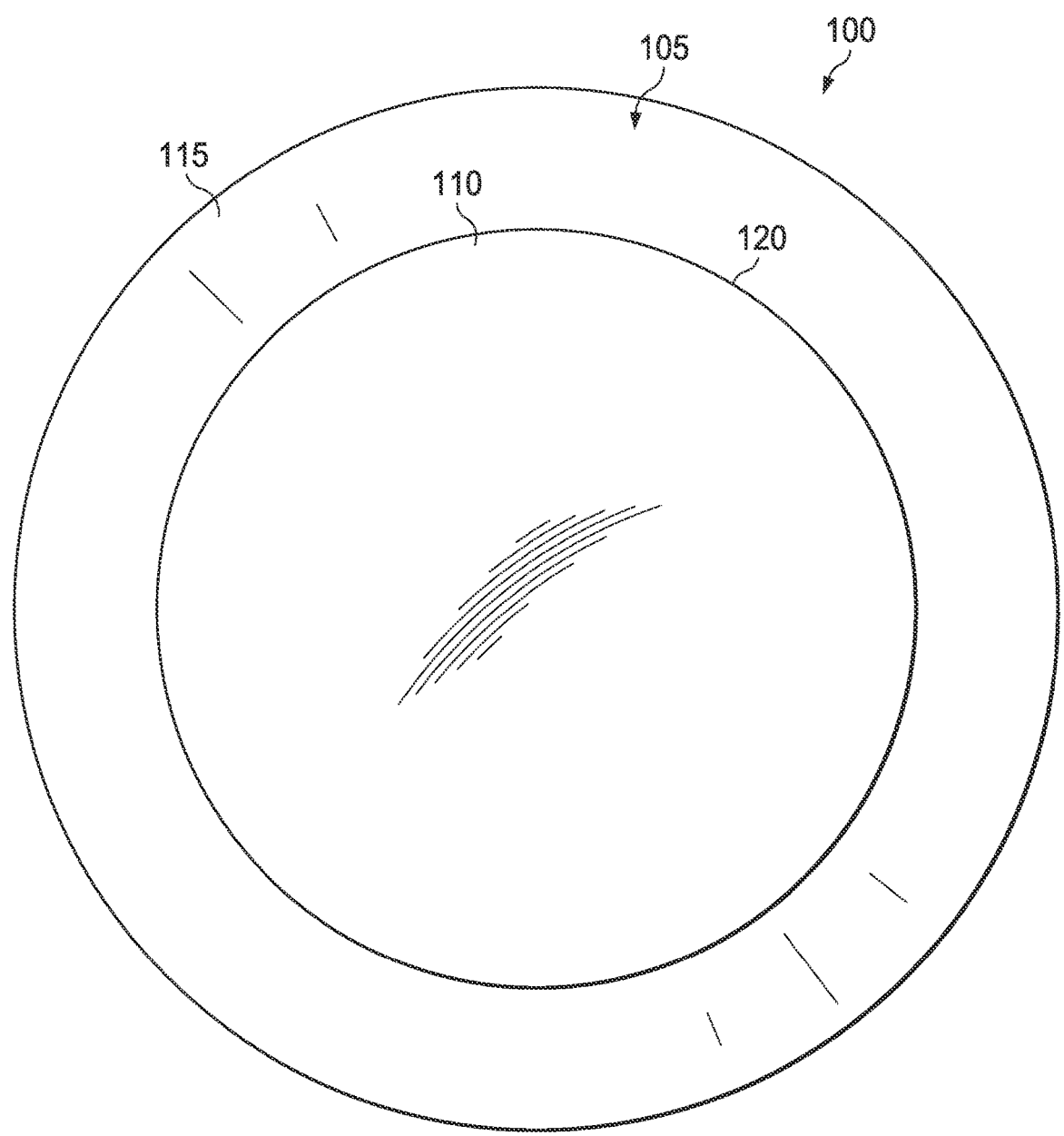
FIG. 1 is a top view of an example of a lens, illustrating various features that may be associated with some embodiments.

FIG. 1 is a top view of an example of a lens 100 illustrating various features that may be associated with some embodiments. As illustrated in the example of FIG. 1, the lens 100 may include an anterior optic surface 105, which may comprise a central optic 110, a peripheral optic 115, and a capsule rim 120 separating the central optic 110 and the peripheral optic 115. In some embodiments, the capsule rim 120 may define at least a portion of the central optic 110. Additionally, or alternatively, some embodiments of the capsule rim 120 may be symmetric, as illustrated in FIG. 1. More specifically, some embodiments of the capsule rim 120 may be circular.

Figure 2:
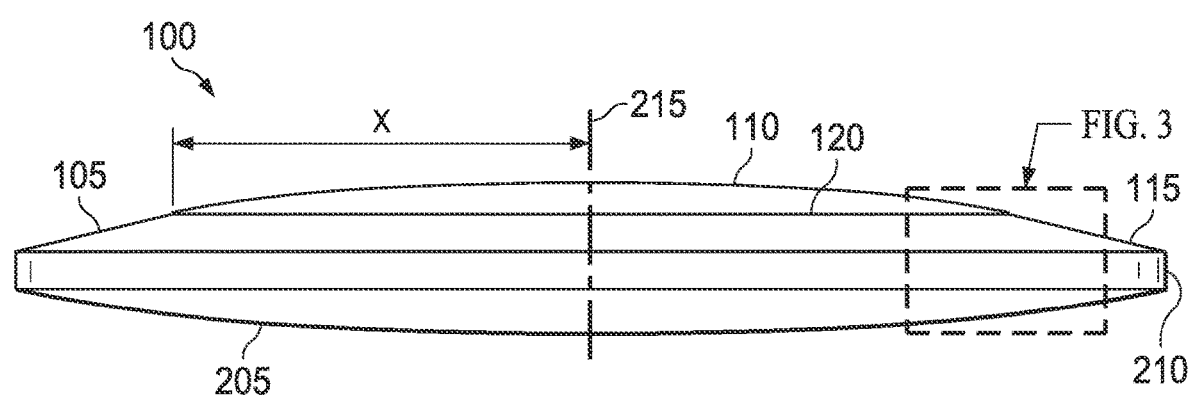
FIG. 2 is a side view of the lens of FIG. 1.

FIG. 2 is a side view of the lens 100 of FIG. 1, illustrating additional features that may be associated with some embodiments. For example, the lens 100 of FIG. 2 includes a posterior optic surface 205 and an optic edge 210 coupling the posterior optic surface 205 to the anterior optic surface 105. More particularly, as illustrated in FIG. 2, the optic edge 210 may couple the posterior optic surface 205 to the peripheral optic 115 of the anterior optic surface 105. Additionally, FIG. 2 further illustrates the circular example of the capsule rim 120 of FIG. 1 having a radius X about an optical axis 215. A radius X in a range of about 2 millimeters to about 3 millimeters may be suitable for some embodiments. Moreover, as illustrated in FIG. 2, the optical axis 215 may be substantially orthogonal to the central optic 110 in some embodiments.

The optic edge 210 of FIG. 2 is a straight edge. In other examples, the optic edge 210 may be a curved edge or may comprise more than one curved edge. For example, the optic edge 210 may include a plurality of distinct curved surfaces, which may be tangentially connected to one another. In some embodiments, each of the curved surfaces may have a different radius of curvature. Additionally, the peripheral optic 115 may be tangentially connected to the optic edge 210 in some examples.

The anterior optic surface 105 and the posterior optic surface 205 of FIG. 2 are both convex. In other embodiments, the anterior optic surface 105 and the posterior optic surface 205 may have any suitable combination of concave, convex, or flat surface profiles. The anterior optic surface 105, the posterior optic surface 205, or both may include any suitable spherical, aspheric, refractive, diffractive, or phase shifting features to focus and direct light.

In some examples, the lens 100 may be an intraocular lens, and the anterior optic surface 105 may have an anterior optical diameter in a range of 4.5 millimeters to 7 millimeters. The thickness of the optic edge 210 (measured along the optical axis 215 of the lens 100) may be in a range of 0.15 millimeters and 0.45 millimeters or higher. The posterior optic surface 205 can have a posterior optical diameter in a range of 5.0 millimeters to 8.5 millimeters. The posterior optical diameter can be dependent on the anterior optical diameter, and in some embodiments, the posterior optical diameter may be greater than the anterior optical diameter.

The anterior optical diameter and the posterior optical diameter may be selected based on the size of the eye or pupil of a patient. For example, visual disturbances such as positive and negative dysphotopsia can occur more frequently in patients with larger pupil sizes. A relatively larger anterior optical diameter and posterior optical diameter can reduce or eliminate glare and other visual disturbances by allowing the lens 100 to receive and focus greater amounts of light to the retina.

Figure 3:
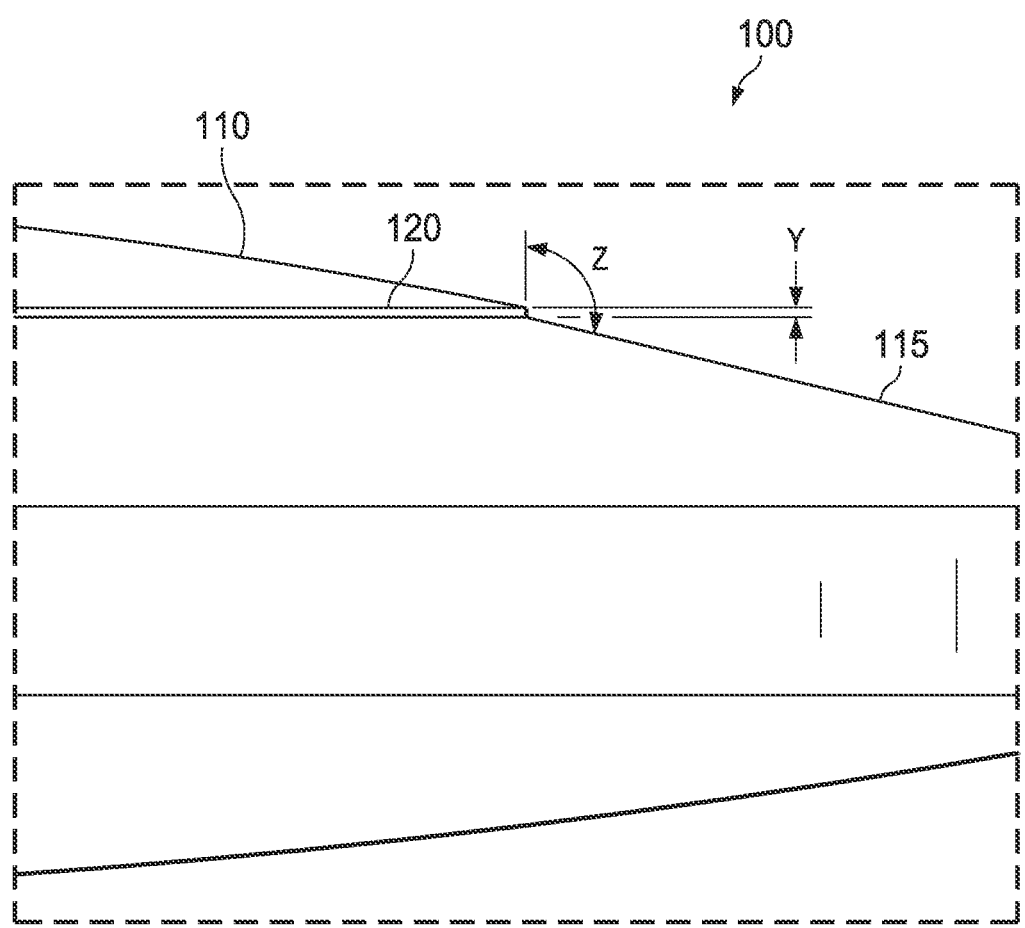
FIG. 3 is a detail view of the lens of FIG. 2.

FIG. 3 is a detail view of the lens 100 of FIG. 2, illustrating additional features that may be associated with some embodiments. In the example of FIG. 3, the capsule rim 120 has an edge-to-edge thickness Y. The thickness Y may vary, but a thickness Y in a range of about 19 micrometers to about 20 micrometers may be suitable for many applications. For example, the thickness Y may be about 19.5 micrometers in some embodiments. A capsule rim 120 of suitable dimensions may be manufactured by modifying the anterior optic surface 105 to add a step down from the central optic 110 with lathing or by incorporating the features in molded lenses, for example. Additionally, the capsule rim 120 of FIG. 3 forms a surface at an angle Z relative to the peripheral optic 115. An angle Z of at least 90 degrees may be advantageous for some embodiments. Additionally, or alternatively, the capsule rim 120 may form a surface that is substantially parallel to the optical axis 215. In other embodiments, the central optic 110 may be recessed relative to the peripheral optic 115, and the capsule rim 120 may provide a step down from the peripheral optic 115 to the central optic 110.

Figure 4:
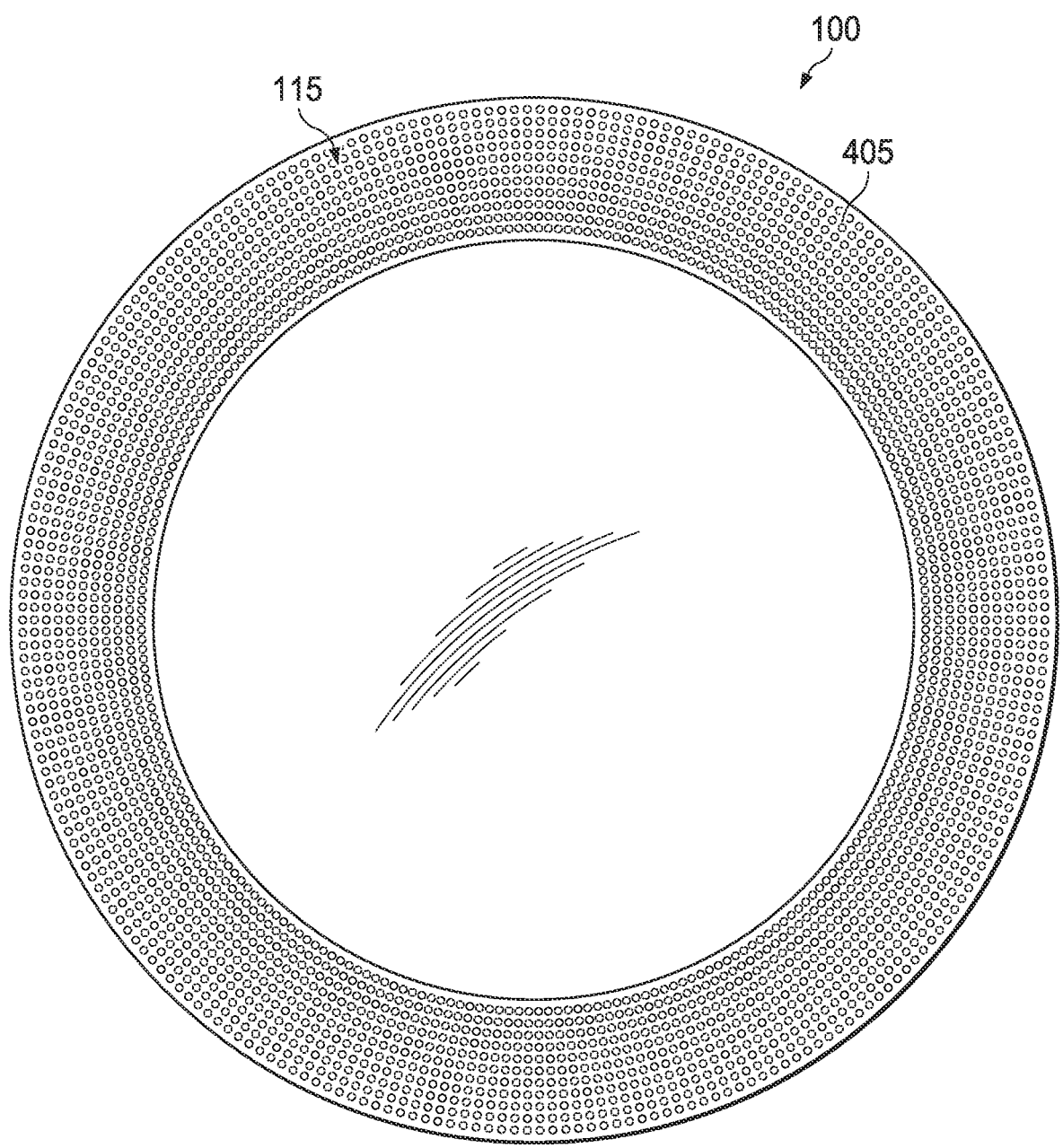
FIG. 4 is a top view of another example of a lens, illustrating various features that may be associated with some embodiments.

FIG. 4 is a top view of another example of the lens 100, illustrating additional or alternative details that may be associated with some embodiments. As illustrated in the example of FIG. 4, the peripheral optic 115 may have a textured surface 405 in some embodiments. The texture surface 405 may comprise or consist essentially of a pattern, which in some examples may be transferred from tooling or from injection molded wafers. In some examples, the textured surface 405 may be directly machined into the lens 100 and/or etched into the lens 100 during known manufacturing processes. Subsequently, the textured surface 405 may range from less than a nanometer to hundreds of microns in depth.

Figure 5:
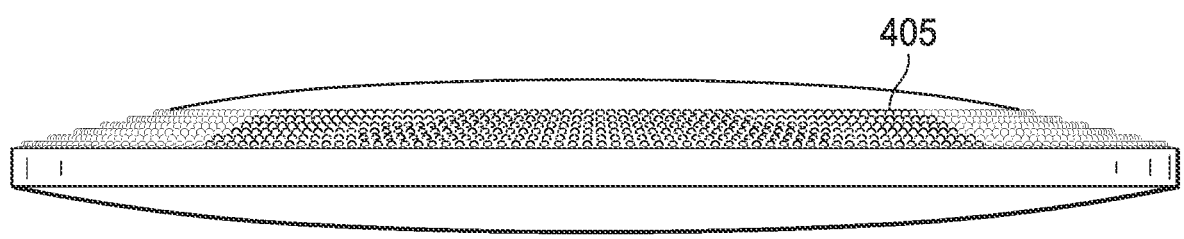
FIG. 5 is a side view of the lens of FIG. 4.
Figure 6:
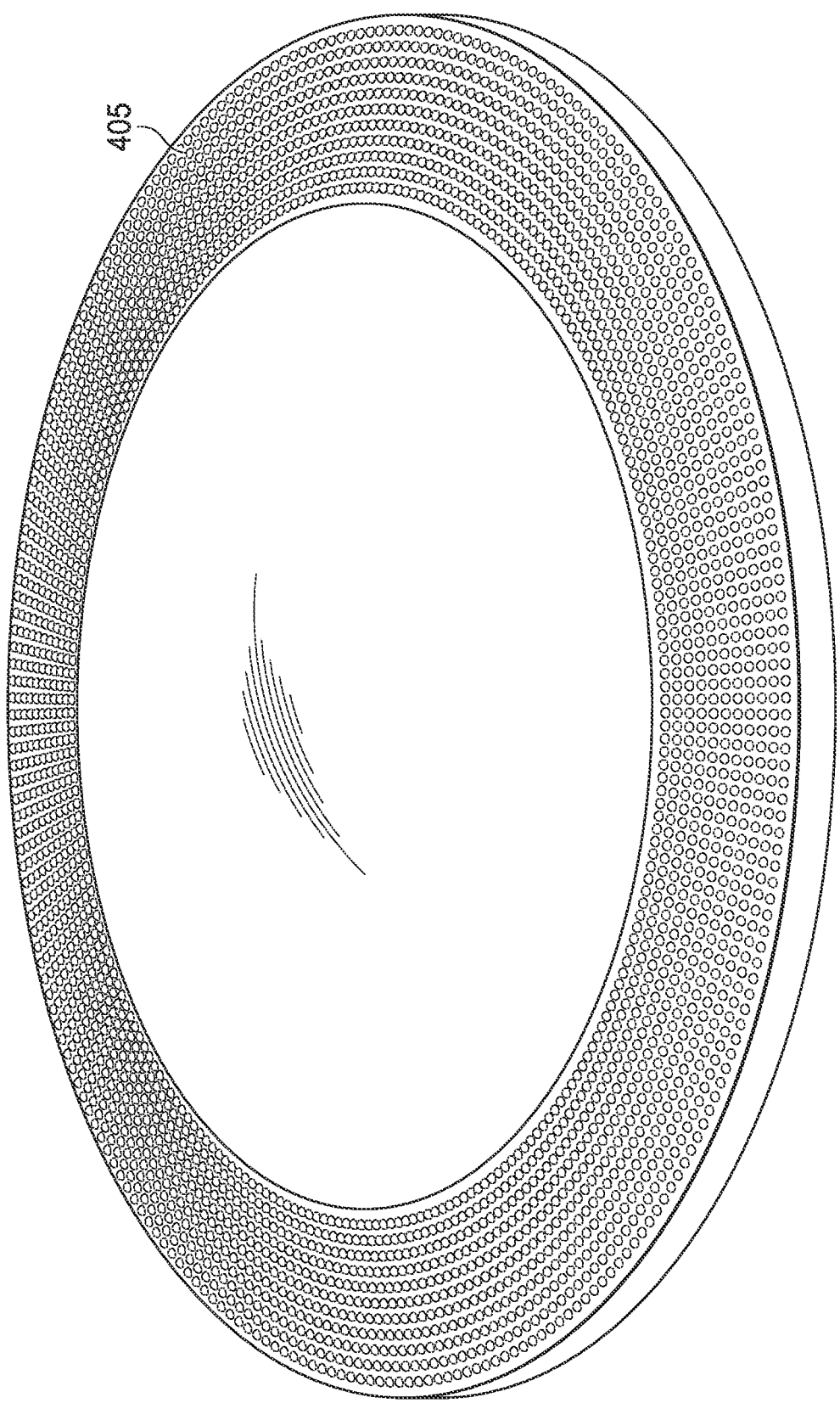
FIG. 6 is an isometric view of the lens of FIG. 4.

FIG. 5 is a side view of the lens 100 of FIG. 4, and FIG. 6 is an isometric view of the lens 100 of FIG. 4 illustrating the textured surface 405 in additional detail.

Figure 7:
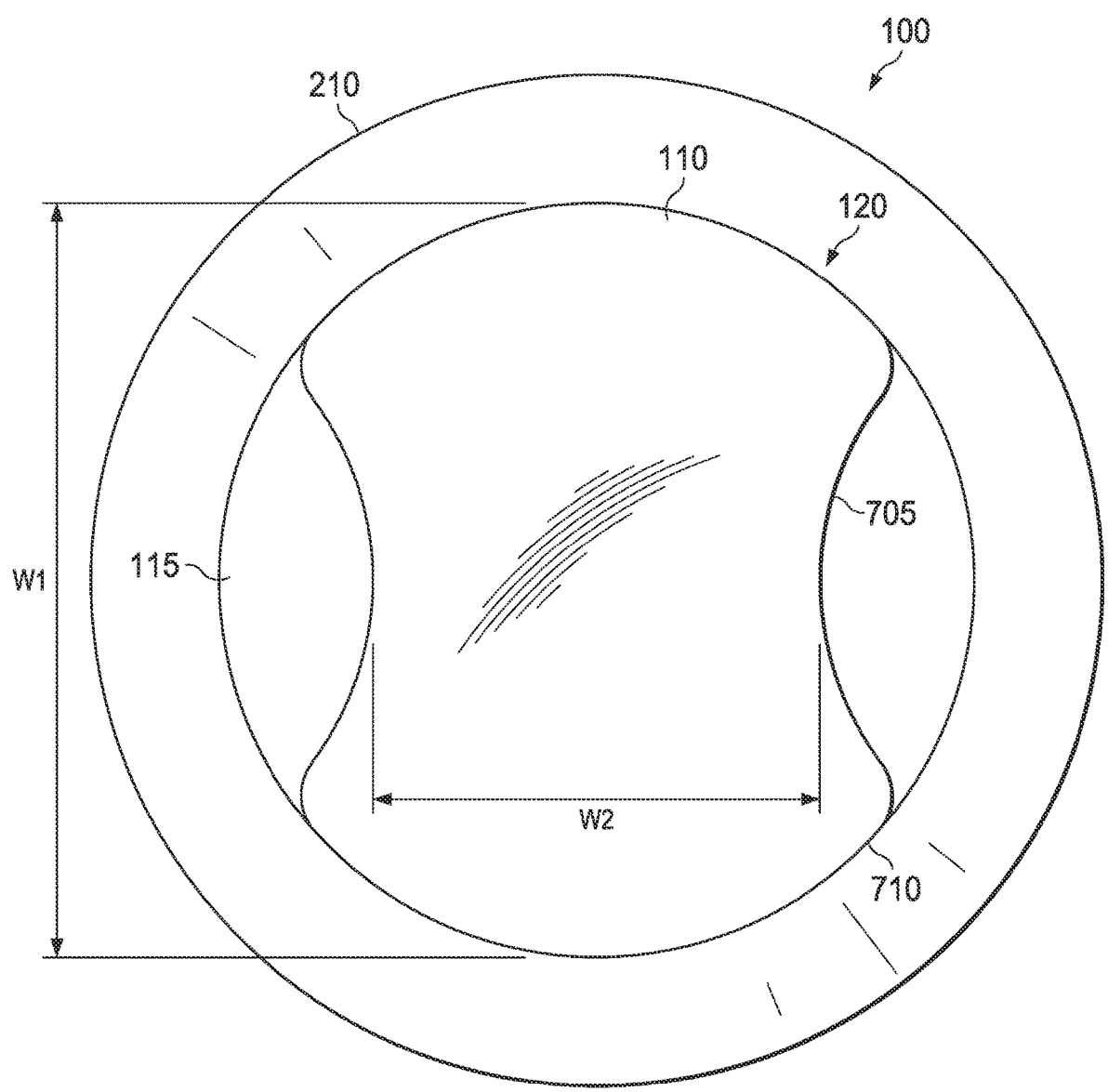
FIG. 7 is a top view of another example of a lens, illustrating additional or alternative details that may be associated with some embodiments.

FIG. 7 is a top view of another example of the lens 100, illustrating additional or alternative details that may be associated with some embodiments. For example, some embodiments of the capsule rim 120 may have an alternative profile. Some embodiments of the capsule rim 120 may be a closed curve having at least one convex arc and one concave arc. In the example of FIG. 7, the capsule rim 120 has two concave arcs 705 and two convex arcs 710, which are oriented to maintain symmetry in the profile of the capsule rim 120. The convex arcs 710 may be concentric with the optic edge 210 in some examples, as illustrated in FIG. 7. The capsule rim 120 of FIG. 7 may additionally or alternatively be characterized by an outer width W1 between the two convex arcs 710 and an inner width W2 between the two concave arcs 705. In other examples, the capsule rim 120 may have an asymmetrical profile. The width W1 and the width W2 may vary according to anatomical or procedural requirements. For example, a width W1 in a range of about 3 millimeters to about 6.5 millimeters or approximately 0.5 millimeters less than the optical diameter, and more particularly about 5.5 millimeters for a 6-millimeter optical body, may be suitable for many applications. The width W2 is generally less than the width W1. A ratio of W2/W1 in a range of about 1 to about 0.5 may be suitable for some examples.

Figure 8:
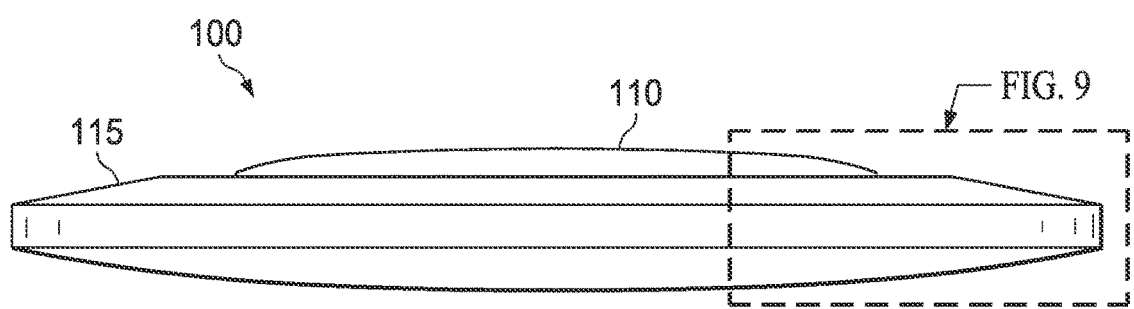
FIG. 8 is a side view of the lens of FIG. 7.
Figure 9:
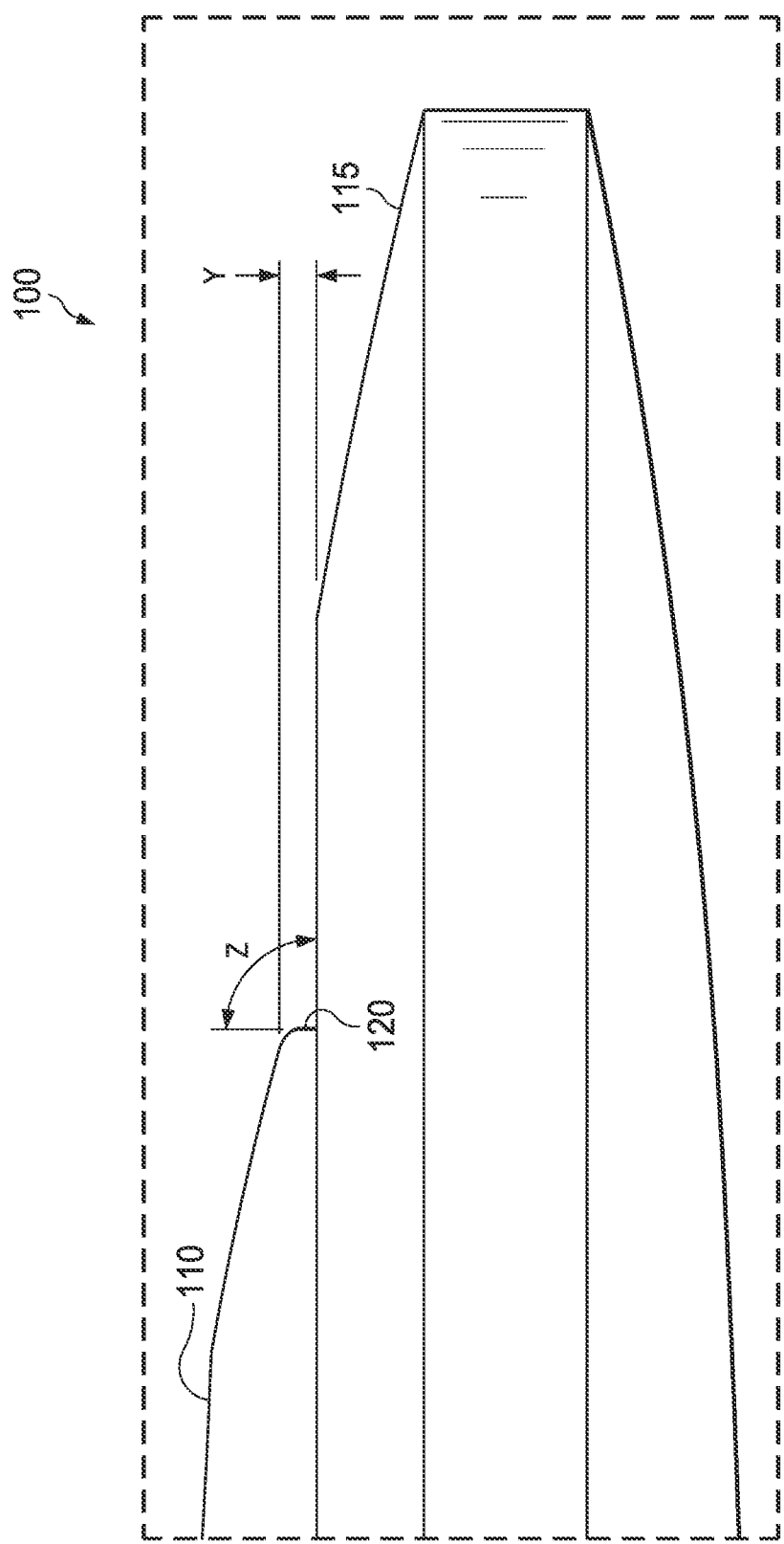
FIG. 9 is a detail view of a portion of the lens of FIG. 8.

FIG. 8 is a side view of the lens 100 of FIG. 7, and FIG. 9 is a detail view of a portion of the lens 100 of FIG. 8 illustrating additional details that may be associated with some embodiments. For example, at least a portion of the capsule rim 120 of FIG. 9 is curved. In some embodiments, the capsule rim 120 may include a plurality of distinct curved surfaces, which may be tangentially connected to one another. In some embodiments, each of the curved surfaces may have a different radius of curvature. Additionally, the capsule rim 120 may be tangentially connected to the central optic 110, the peripheral optic 115, or both in some examples.

Figure 10:
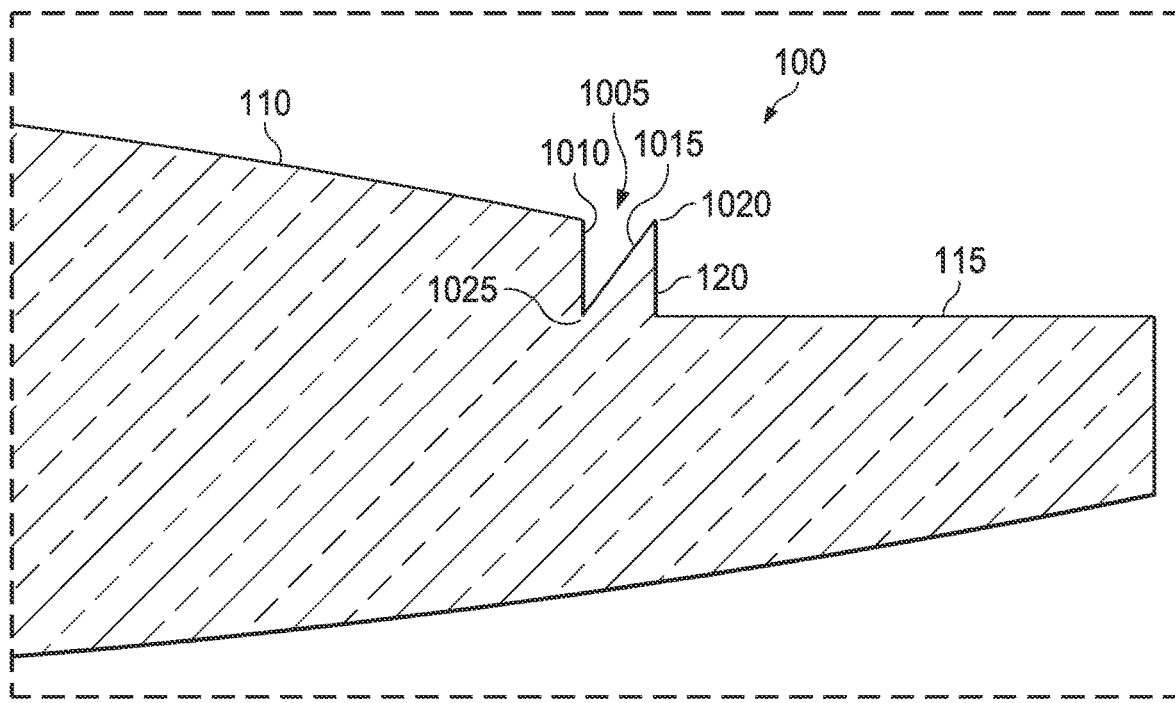
FIG. 10 is a detail view of another example of a lens, illustrating additional or alternate features that may be associated with some embodiments.

FIG. 10 is a detail view of another example of the lens 100, illustrating additional or alternative details that may be associated with some embodiments. For example, as illustrated in FIG. 10, some embodiments of the lens 100 may additionally comprise a transition band 1005 for diffusing or redirecting light away from the capsule rim 120. The transition band 1005 may be disposed inboard of the capsule rim 120. As illustrated in FIG. 10, for example, the transition band 1005 may be disposed between the central optic 110 and the capsule rim 120. In some embodiments, the transition band 1005 may comprise or consist essentially of a transition rim 1010 and a bridge 1015. The transition rim 1010 may be parallel to the capsule rim 120, and the bridge 1015 may connect an anterior edge 1020 of the capsule rim 120 to a posterior edge 1025 of the transition rim 1010. In some examples, the transition rim 1010 and the bridge 1015 may be flat surfaces, as illustrated in FIG. 10; in other examples, the transition rim 1010, the bridge 1015, or both may be curved. For example, the transition rim 1010, the bridge 1015, or both may be convex, concave, or a combination of convex surfaces, convex surfaces, or both. Additionally, or alternatively, the capsule rim 120 may provide a step down from the peripheral optic 115 in some embodiments, and one or more of the central optic 110, the transition rim 1010, and the bridge 1015 may be at least partially recessed relative to the peripheral optic 115.

Figure 11:
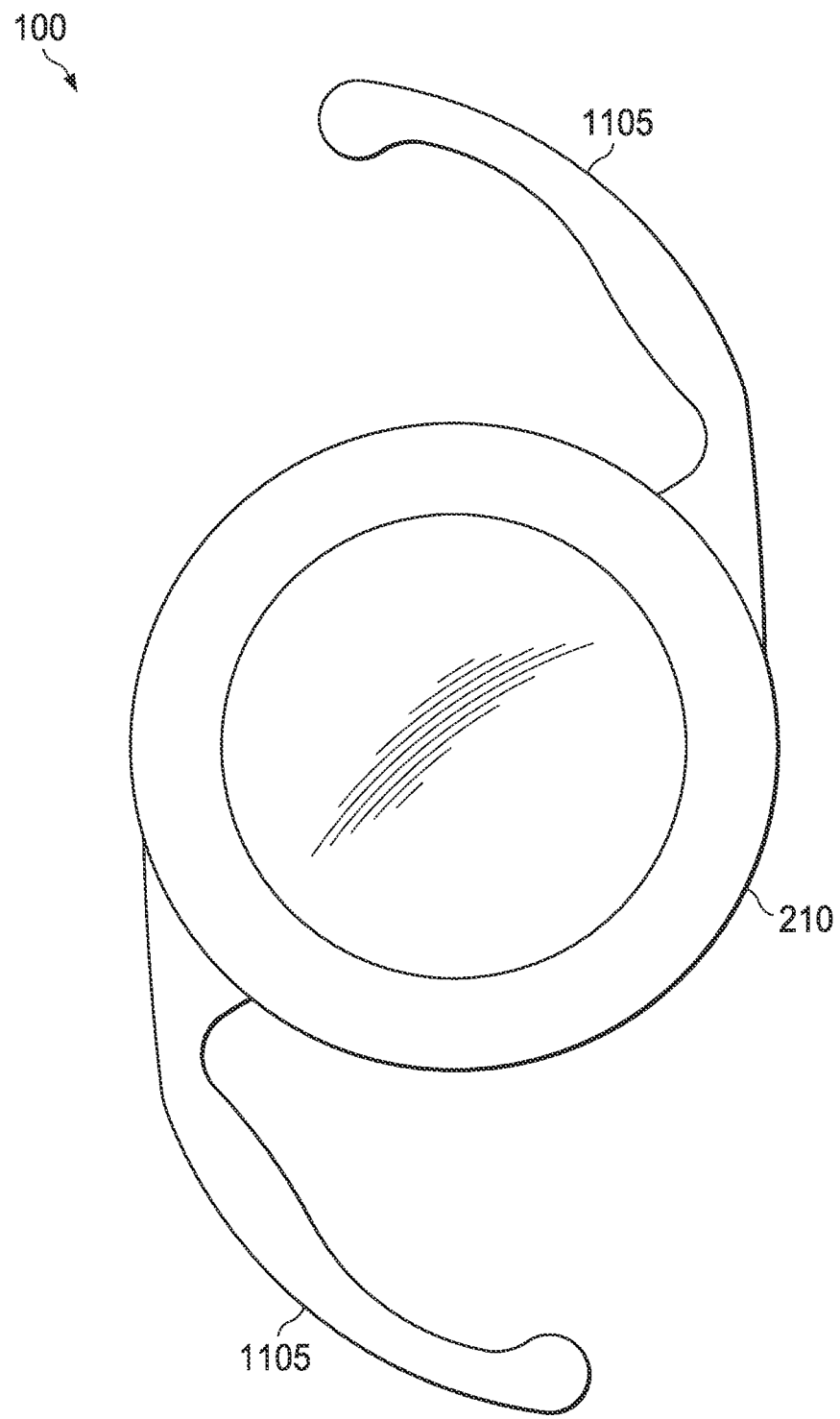
FIG. 11 is a top view of another example of a lens, illustrating additional details that may be associated with some embodiments.

FIG. 11 is a top view of another example of the lens 100 illustrating additional details that may be associated with some embodiments. For example, some embodiments may additionally comprise one or more haptics 1105, which may be coupled to the optic edge 210.

Figure 12A:
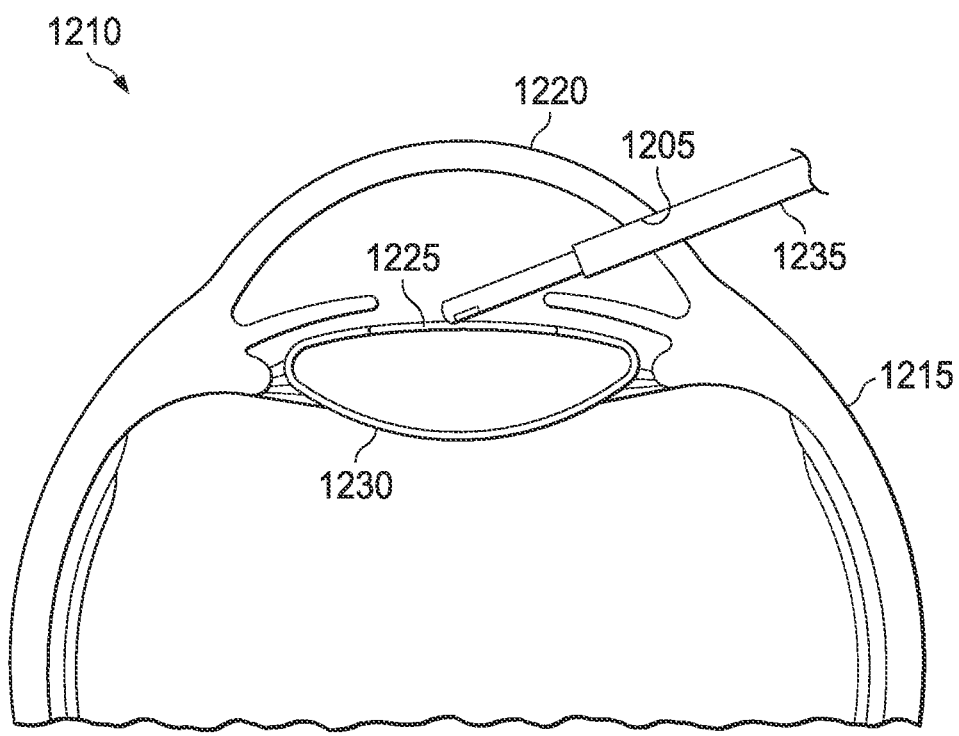
FIGS. 12A-12B are schematic diagrams illustrating an example use of the lens of FIG. 1.
Figure 12B:
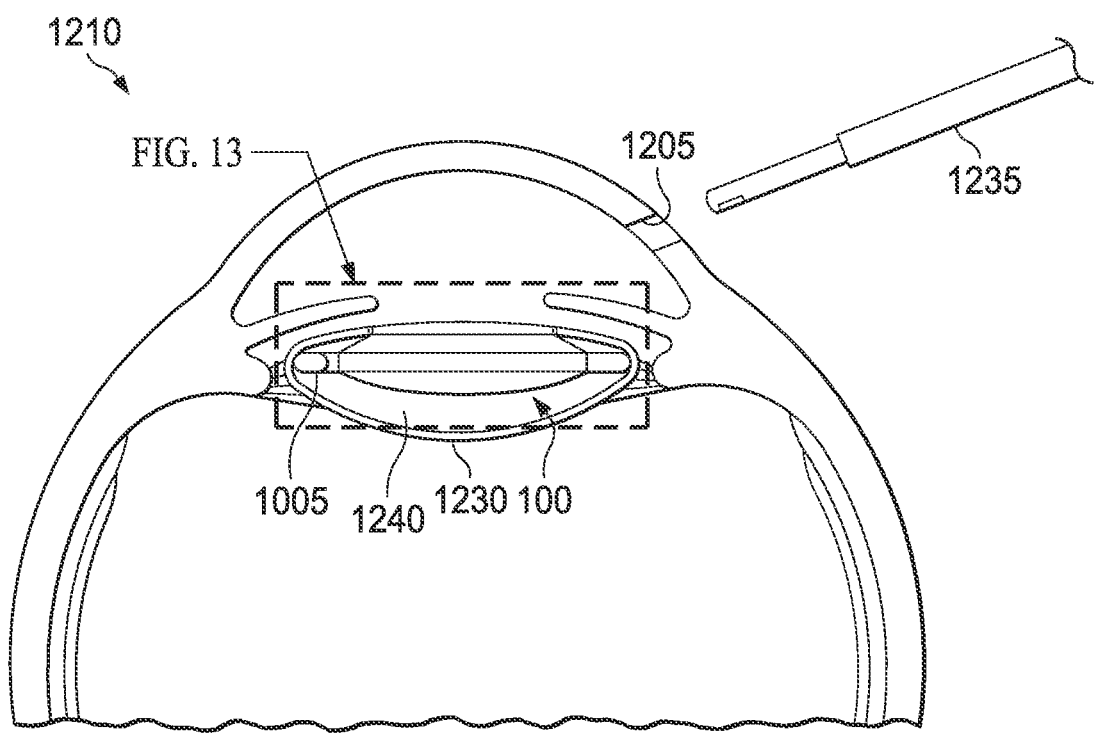

FIGS. 12A-12B are schematic diagrams further illustrating an example use of the lens 100. As illustrated, an incision 1205 may be made in an eye 1210 by a surgeon, for example. In some instances, the incision 1205 may be made through the sclera 1215 of the eye 1210. In other instances, an incision may be formed in the cornea 1220 of the eye 1210. A capsulorhexis opening 1225 can be made in an anterior portion of the capsular bag 1230. For example, a femtosecond laser can be used to create the capsulorhexis opening 1225 with very precise dimensions. The capsulorhexis radius for an average eye size may be about 2.25 millimeters. The incision 1205 may be sized to permit removal of the natural lens from the capsular bag 1230. A nozzle 1235 may also be at least partially inserted through the incision 1205 to deliver the lens 100 into the capsular bag 1230. For example, in some instances, the size of the incision 1205 may have a length less than about 3000 microns (3 millimeters). In other instances, the incision 1205 may have a length of from about 1000 microns to about 1500 microns, from about 1500 microns to about 2000 microns, from about 2000 microns to about 2500 microns, or from about 2500 microns to about 3000 microns.

The nozzle 1235 can be inserted through the incision 1205 into an interior portion 1240 of the capsular bag 1230. The lens 100 can then be ejected through the nozzle 1235 into the capsular bag 1230. In some applications, the lens 100 may be delivered in a folded configuration and can revert to an initial, unfolded state, within the capsular bag 1230, as shown in FIG. 12B. The capsular bag 1230 can retain the lens 100 within the eye 1210 in a relationship relative to the eye 1210 so that the lens 100 refracts light directed to the retina (not shown). In some embodiments, haptics, such as the haptics 1105 can engage the capsular bag 1230 to secure the lens 100 therein.

After dispensing the lens 100 into the capsular bag 1230, the nozzle 1235 may be removed from the eye 1210 through the incision 1205, and the eye 1210 can be allowed to heal over a period of time.

Figure 13:
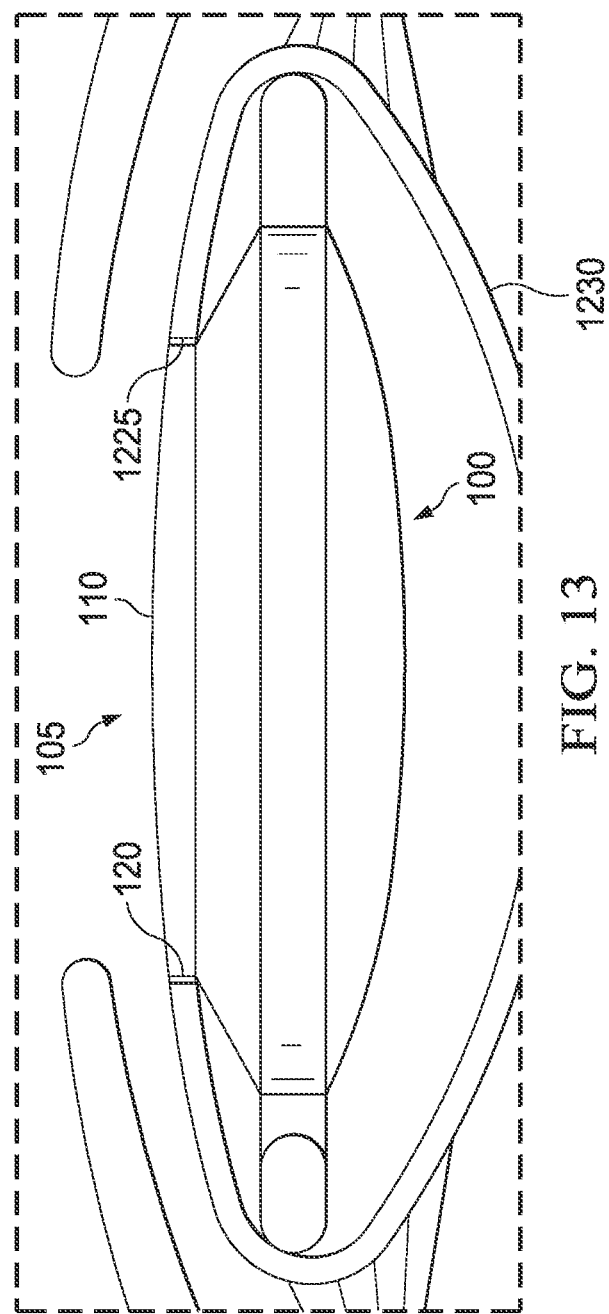
FIG. 13 is a detail view of FIG. 12B.

FIG. 13 is a detail view of FIG. 12B, illustrating additional details of the lens 100 disposed within the capsular bag 1230. In the example of FIG. 13, the capsule rim 120 is configured to sequester the capsulorhexis opening 1225. For example, in FIG. 13 the capsule rim 120 is disposed adjacent to an edge of the capsulorhexis opening 1225, and the central optic 110 is disposed within the capsulorhexis opening 1225. The precision of the capsulorhexis opening 1225 created by a femtosecond laser can allow the capsule rim 120 to interact with the edges of the capsulorhexis opening 1225.

As shown in the example of FIG. 13, the central optic 110 may be positioned to be substantially flush with the outer surface of the capsular bag 1230, which can substantially reduce or eliminate a step change or other discontinuity between the capsular bag 1230 and the anterior optic surface 105. As illustrated in FIG. 13, the capsular bag 1230 may not overlap any portion of the central optic 110. In some embodiments, the central optic 110 may be disposed posterior to the outer surface of the capsular bag 1230, which can redirect large, off-axis light and further mitigate glare and dysphotopsia effects. The peripheral optic 115 can be recessed within the capsular bag 1230. In some embodiments, the peripheral optic 115 may interact with the interior surface of the capsular bag 1230.

In some embodiments, the thickness Y (see FIG. 3) of the capsule rim 120 may be substantially equal to the thickness of the edge of the capsulorhexis opening 1225, as illustrated in the example of FIG. 13. In other examples, the thickness Y may be up to about five (5) times the thickness of the edge of the capsulorhexis opening 1225, so that the central optic 110 remains substantially flush with the outer surface of the capsular bag 1230 and the capsule rim 120 may extend posterior to the capsulorhexis opening 1225.

In some embodiments the radius X (see FIG. 2) of the capsule rim 120 may be slightly larger than the radius of the capsulorhexis opening 1225 to provide elastic tension. For example, if the capsulorhexis opening 1225 has a radius of 2.25 millimeters, the capsule rim 120 may have a radius of about 2.5 millimeters. In other examples, the capsule rim 120 may not be symmetric and may provide elastic tension along one or more selected axis. For example, some embodiments of the capsule rim 120 may provide elastic tension orthogonal to the haptics.

Additionally, or alternatively, some embodiments may have the textured surface 405 that can scatter transient light from the periphery and edge of the lens 100.

The systems, apparatuses, and methods described herein may provide significant advantages. For example, the lens 100 can provide more rotational resistance than other lenses, including open-loop, single piece designs, which may be particularly advantageous for toric lenses where each degree of rotation can cause significant loss in cylinder power. Some embodiments of the lens 100 provide significant rotational stability and may substantially eliminate lens rotation until the capsular bag fuses. Additionally, features such as the capsule rim 120 can sequester the edges of the capsulorhexis opening, which, in contrast to other designs, can prevent the anterior capsule from covering the central optic. Such features can substantially reduce or eliminate reflections from the capsule, which can substantially reduce or eliminate the incidence of negative dysphotopsia resulting from light entering the eye at very large visual angles and striking the edge of the capsulorhexis opening 1225.

While shown in a few illustrative embodiments, a person having ordinary skill in the art will recognize that the systems, apparatuses, and methods described herein are susceptible to various changes and modifications that fall within the scope of the appended claims. For example, various features such as the capsule rim 120 and the textured surface 405 can be incorporated into plate or multi-piece lenses of hydrophobic or hydrophilic materials. Moreover, descriptions of various alternatives using terms such as "or" do not require mutual exclusivity unless clearly required by the context, and the indefinite articles "a" or "an" do not limit the subject to a single instance unless clearly required by the context. Components may be also be combined or eliminated in various configurations for purposes of sale, manufacture, assembly, or use. For example, in some configurations, features of the capsule rim 120 and the textured surface 405 can be combined in various ways.

The claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

What is claimed is:

1. An ophthalmic lens comprising:
   a posterior optic surface;
   an anterior optic surface comprising a central optic, a peripheral optic, and a capsule rim separating the central optic and the peripheral optic; and
   an optic edge coupling the posterior optic surface to the peripheral optic;
   wherein the capsule rim has a first radius, the central optic has a second radius, and the second radius is less than or equal to the first radius;
   wherein the central optic comprises an optic axis and the capsule rim forms a surface that is substantially parallel to the optic axis;
   wherein the capsule rim is sized and configured to sequester an edge of a capsulorhexis opening; and
   wherein the central optic is sized and configured to be substantially flush with an outer surface of the capsular bag.

2. The ophthalmic lens of claim 1, wherein the capsule rim is symmetric.

3. The ophthalmic lens of claim 1, wherein the capsule rim is asymmetric.

4. The ophthalmic lens of claim 1, wherein the capsule rim has a thickness in a range of about 19 micrometers to about 20 micrometers.

5. The ophthalmic lens of claim 1, wherein the capsule rim has a thickness substantially equal to a thickness of an anterior capsular bag.

6. The ophthalmic lens of claim 1, wherein the capsule rim has a radius in a range of about 2 millimeters to about 3 millimeters.

7. The ophthalmic lens of claim 1, wherein the peripheral optic comprises a textured surface.

8. The ophthalmic lens of claim 7, wherein the textured surface is configured to diffuse light.

9. The ophthalmic lens of claim 1, further comprising a transition band configured to diffuse or redirect light.

10. The ophthalmic lens of claim 1, wherein the central optic is recessed.

11. The ophthalmic lens of claim 1, further comprising at least two haptics coupled to the optic edge.

12. An ophthalmic lens comprising:
    a posterior optic surface;
    an anterior optic surface comprising a central optic, a peripheral optic, and a capsule rim separating the central optic and the peripheral optic; and
    an optic edge coupling the posterior optic surface to the peripheral optic;
    wherein the capsule rim comprises a closed curve having at least one convex arc and at least one concave arc;
    wherein the capsule rim has a first width, the central optic has a second width, and the second width is less than or equal to the first width;
    wherein the central optic comprises an optic axis and the capsule rim forms a surface that is substantially parallel to the optic axis;
    wherein the capsule rim is sized and configured to sequester an edge of a capsulorhexis opening; and
    wherein the central optic is sized and configured to be substantially flush with an outer surface of the capsular bag.

13. The ophthalmic lens of claim 12, wherein the capsule rim is symmetric.

14. The ophthalmic lens of claim 12, wherein the capsule rim is asymmetric.

* * * * *